US005339925A

United States Patent [19]

Price

[11] Patent Number: 5,339,925
[45] Date of Patent: Aug. 23, 1994

[54] HYDRAULIC CHAIN LIFT

[76] Inventor: Raymond D. Price, 367 Dade Dr., Nashville, Tenn. 37211

[21] Appl. No.: 155,777

[22] Filed: Nov. 23, 1993

[51] Int. Cl.[5] .......... B60S 13/00
[52] U.S. Cl. .......... 187/8.41; 254/89 H
[58] Field of Search .......... 187/8.41, 8.63, 8.65, 187/17, 26, 8.59, 8.5; 254/89 H, 93 R, 4 R, 4 B, 4 C

[56] References Cited

U.S. PATENT DOCUMENTS 2,661,816 12/1953 Hulsant .......... 187/8.41
3,788,197 1/1974 Bishop .......... 91/1
5,052,520 10/1991 Wakamiya .......... 187/8.67
5,129,483 7/1992 Nussbaum .......... 187/8.41
5,143,179 9/1992 Hornstein .......... 187/8.41
5,148,827 9/1992 Masters .......... 137/209

FOREIGN PATENT DOCUMENTS 45488 2/1974 Australia .......... 187/8.41
8807496 10/1988 European Pat. Off. .......... 254/89 H
52-31443 9/1977 Japan .

*Primary Examiner*—Kenneth W. Noland
*Attorney, Agent, or Firm*—Richard C. Litman

[57] ABSTRACT

A lift for motor vehicles using hydraulic cylinders powered by a remote electrical hydraulic pump. The hydraulic cylinders lift pistons having an upper distal area adaptable for receiving the payload vehicle. The pistons are rigidly linked to each other at their lower proximal ends by an equalizer beam. The upper distal area of each piston includes a mounting plate for accepting a lifting platform for bearing the payload vehicle. The pistons of the lift raise the payload vehicle using the hydraulic cylinders in connection with a series of chains and pulleys. The pulleys are mounted on the hydraulic cylinders. The chains are attached from an upper chain anchor at the top of the lift structure, to the pulleys on the hydraulic cylinder, and to a lower chain anchor on the equalizer beam. Each hydraulic cylinder is contained within a sleeve fixedly mounted to a cylinder mount post. As the hydraulic cylinders are moved in a vertical direction by the hydraulic pump, the chain and pulley systems force the pistons to move in a vertical clockwise direction in unison.

14 Claims, 2 Drawing Sheets

HYDRAULIC CHAIN LIFT

BACKGROUND OF THE INVENTION

1. Field of the Invention

The present invention relates to a hydraulic lift for motor vehicles and in particular relates to an improved high pressure hydraulic chain lift.

2. Description of the Prior Art

Hydraulic lifts for motor vehicles are often set underground. In their retracted state, the external members of the lift withdraw into the floor. This configuration is convenient because it is less cumbersome and consumes less space than above-ground lifts. Many underground lifts in the past were operated using low hydraulic pressure. Hydraulic lifts operated with low pressure often require a large amount of oil or other hydraulic fluids in their operation. Low pressure lift systems typically use approximately 45 gallons of hydraulic oil. In addition, prior hydraulic lifts typically included a reservoir tank of hydraulic oil buried underground along with the lift. It is often difficult to determine the existence of an oil leak from the underground tank before a large amount of oil seeps into and permeates the surrounding environment. This is especially true with low pressure lifts. Storing the tank underground also makes maintenance of the lift more difficult and cumbersome.

U.S. Pat. No. 5,148,827, issued to Howard A. Masters on Sep. 22, 1992 describes an air-oil full hydraulic reservoir tank in which a hydraulic lift cylinder raises and lowers a piston as air is forced into the reservoir tank, thereby forcing oil from the reservoir tank and into the lift cylinder.

U.S. Pat. No. 5,143,179, issued to Roland Hornstein on Sep. 1, 1992 describes a high pressure lifting platform where a relatively narrow high-pressure cylinder is coaxially positioned within an outer supporting piston. Lubrication of the friction surface between the guide bushing and the piston is automatically regulated.

U.S. Pat. No. 5,129,483, issued to Hans Nussbaum on Jul. 14, 1992 describes a lift using a cylinder-piston arrangement with a cable and deflection roller attached to a lift cylinder disposed within a piston with telescoping sleeves.

U.S. Pat. No. 5,052,520, issued to Koji Wakamiya on Oct. 1, 1991 describes an underground hydraulic lift including sliders with attachment holders in which desired attachments for directly supporting a vehicle can be detachably set.

Japanese Kokai ("laid-open") Patent No. 52-31443 issued to Tozaburo Tsujimura on Sep. 3, 1977 describes a safety device for a vehicle lift in which an eccentric cam engages a support post to prevent the carriage from accidentally dropping when the chain for lifting the carriage breaks.

U.S. Pat. No. 3,788,197, issued to Billy H. Bishop on Jan. 29, 1974 describes a protective housing for preventing corrosion from the electric current to the lift mechanism.

None of the above patent references, either alone or in combination, is seen to describe the instant invention as claimed. While these and other patents disclose underground lifts using hydraulic cylinders in conjunction with pistons, the known prior art does not disclose or suggest the use of the particular pulley and chain system of the present invention for a more efficient hydraulic lift system.

SUMMARY OF THE INVENTION

The object of the invention is to overcome the foregoing difficulties and shortcomings involved in hydraulic lifts.

Another object of the invention is to provide a hydraulic chain lift that can effectively lift an 8,000 pound vehicle while requiring less than 4 gallons of hydraulic fluid oil.

Yet another object of the invention is to provide a hydraulic lift in which an oil leak can be caught in a trough at the base of the lift.

Another object of the invention is to provide a hydraulic lift which allows for easy maintenance.

A further object of the invention is to provide a hydraulic lift using a pulley and chain system in conjunction with the lifting cylinders.

To achieve the objects of the invention and in accordance with the purpose of the invention, as embodied and broadly described herein, a preferred embodiment of the invention comprises an upper section; at least one piston for raising a vehicle; at least one lifting cylinder support mount connected to the upper section; a lifting cylinder for moving each piston, mounted on the lifting cylinder support mount; a pulley means for transferring force from the lifting cylinder to each piston, the pulley means further including a chain for connecting the upper section to a lower end of the piston; a first pulley attached to a top end of the lifting cylinder for coupling the chain to the lifting cylinder; and a second pulley attached to the lifting cylinder support mount and located below the first pulley; wherein the chain follows along a path from the upper section, to the second pulley, to the first pulley, to the lower end of the piston; wherein the piston is lifted when the lifting cylinder is raised.

These and other objects of the present invention will become readily apparent upon further review of the following specification and drawings.

DETAILED DESCRIPTION OF THE PREFERRED EMBODIMENTS

Figure 1:
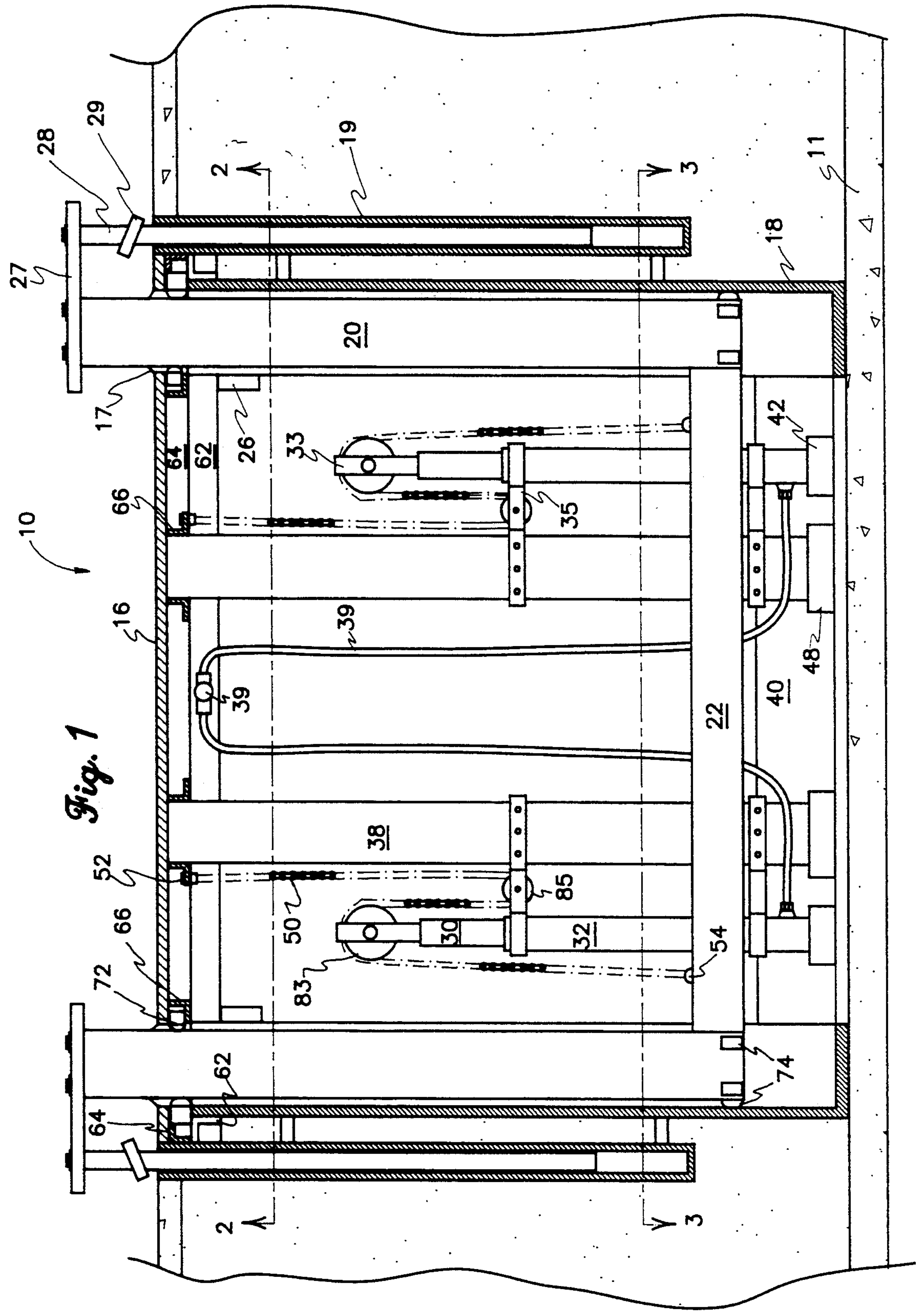
FIG. 1 is a side elevated view of the preferred embodiment of the hydraulic chain lift according to the present invention.

Referring now to the accompanying drawings, a preferred embodiment of the present invention is illustrated. None of the disclosed embodiments should be construed as limiting the scope of the present invention. Preferably, as shown in FIG. 1, lift 10 is set underground with a concrete slab 11 to serve as a foundation. Open side areas of lift 10 are enclosed by rigid steel panels 15. The underground area around lift 10 should be packed with a suitable filler such as clean sand.

Lift 10 includes an upper section 12 and a lower section 14. Upper section 12 is preferably set approximately three inches below the floor level. Floor cover plate 16 is placed over the upper section 12, and floor cover plate 16 should rest at about a quarter inch above the floor surface. Pistons 20 rise from the floor through corresponding openings in piston housing 18 and floor cover plate 16. Floor cover plate 16 includes wipers 17 to form a more watertight seal about piston 20. While lift 10 may be used with four or more pistons, it is preferred that only two be used in a symmetrical configuration, as shown in FIG. 1. Pistons 20 are preferably ten inch by ten inch square steel beams with rounded corners. Depending on the amount of elevational distance required for lift 10, pistons 20 may be of any suitable length. Pistons 20 are disposed within a piston housing 18 which is preferably a 12 inch by 12 inch housing with a gap on one side, in order to allow equalizer beam 22 to travel in a vertical direction along piston housing 18. Equalizer beam 22 joins opposite pistons 20 together. Upper section 12 includes a stopping brace 26 to prevent equalizing beam 22 and the matching pistons 20 from rising above a predetermined height within lift 10. Stopping braces 26 are attached near the piston housings 18 so as to not interfere with the chain and pulley system.

Mounting plate 27 is situated on the upper end of piston 20 for accepting a lifting platform. The lifting platform may be of any suitable type for holding motor vehicles or other like payload objects. Lift 10 includes safety leg housing 19 for accepting the safety leg 28 from a lifting platform. The safety leg 28 may also include a leg latch 29 to hold up the payload should the hydraulic lift fail by supporting the safety leg 28 about the opening to the safety leg housing 19.

Equalizer beam 22 is affixed to the lower bottom end of pistons 20 in order to join pistons 20 together. Equalizer beam 22 acts to synchronously lift pistons 20. The structure of equalizer beam 22, which is preferably two parallel beams, will be discussed in further detail later.

Lift 10 uses a hydraulically driven high pressure lifting cylinder 30 to lift pistons 20, wherein the lifting cylinder 30 is contained within cylinder sleeve 32. In the present invention, pistons 20 and lifting cylinder 30 can lift 8,000 pounds using roughly 3.5 gallons of hydraulic oil for lifting cylinder 30. Cylinder mount post 38, which is preferably a four inch by four inch square steel tube, is attached to both upper section 12 and lower section 14. Insert mounts 42 and 48 are formed on lower section 14, which is preferably a U-shaped steel channel, to accept the bottom end of cylinder sleeve 32 and mount post 38. Channel 40 is welded to the bottom of both piston housings 18 to form a trough for catching and collecting any oil that may leak into lift 10. Metal brackets 35 couple mount post 38 to lifting cylinder 30. Angle mounts are affixed onto upper section 12 serve as upper mounts for mount post 38.

Angle mounts are preferably L-shaped. Angle mounts can be of any appropriate crosswise length. Primary angle mount 62 is an elliptical angle mount that is four inches by six inches ("4× 6") in a perpendicular dimension, and which is attached to and surrounds piston housings 18 to form a perimeter about lift 10. Preferably, the vertical portion of primary mount 62, which is welded to piston housing 18, is longer than the horizontal portion. The shorter horizontal portion of primary angle 62 serves as a mounting platform for other angles, including the floor plate holder 64. Corresponding elliptical angle mount 64 is welded to the distal horizontal edge of primary angle mount 62 to form part of floor cover plate holder. A plurality of straight angle mounts 66 that are preferably three inches by three inches ("3×3") in dimension, are attached to the horizontal portion of primary mount 62. Four straight angles 66 span the distance between opposing sides of elliptical angle 62 to serve as welding mounts for mount post 38 and chain 50. Two additional straight angles 66 are included near the distal ends of upper section 12 to enclose the open end of the piston housings 18.

Lower bearings 74 are located on the side of the piston 20 opposite to the equalizer beam to help guide the movement of piston 20 within piston housing 18. Lower bearings 74 may be in the form of balls or rollers, and be made of plastic, steel, or any other suitable material. Upper section 12 includes upper bearings 72 disposed around the opening to piston housing 18 in order to help guide piston 20 in and out of piston housing 18. Upper bearings 72 are attached to the horizontal portions of angle braces 62 around housing 18. Upper bearings 72 may be mounted flush along a plane or horizontally askew as shown in FIG. 1. Any bearing type suitable for lower bearing 74 may be used for upper bearings 72. Although the drawings show a bearing held within a housing, it is understood that any suitable type of bearing or roller may be used.

Primary pulley 83 is affixed to the top end of lifting cylinder 30 by bracket 33. Rotatable about a horizontal axis, primary pulley 83 rises with lifting cylinder 30. Outer rims are preferably disposed along the reel of primary pulley 83 to retain chain 50. Secondary pulley 85 is located on a secondary bracket 35 connecting mount post 38 to lifting cylinder sleeve 32 wherein lifting cylinder 30 is centrally disposed. Secondary pulley 85 also contains outer rims along the reel, to interact with and retain chain 50.

Chain 50 is any suitable chain or cable such as a leaf chain. The interlocking and overlapping rings of a leaf chain provide strength and flexibility. One end of chain 50 is fixed through upper chain anchor hole 52 in upper section 12 and bolted to straight angle weld 66. Chain 50 is attached at upper section 12 in order to allow for easy access for any needed maintenance of the lift mechanisms through cover plate 16. The other end of chain 50 is attached to lower chain anchor 54 located on brace 25 on equalizer beam 22.

Chain 50 follows along a path from the upper section 12 to secondary pulley 85, to primary pulley 83, to lower chain anchor 54. As lifting cylinder is vertically raised, chain 50 travels along the lower gear portion of secondary pulley 85 and the upper portion of the primary pulley 83 to pull and lift the equalizer beam and pistons in unison. Preferably, upper chain anchor hole 52 is located nearer to the center of lift 10 while lower chain anchor 54 is stationed closer to the distal ends of lift 10. When pistons 20 are under heavy stress from the payload therebetween, upper ends of pistons 20 will tend to bend towards the center of lift 10. The outer anchoring of chain 50 in combination with equalizing beam 22 provides a counterbalancing force to keep pistons 20 in proper vertical alignment.

Lifting cylinders 30 are driven by a remote electric hydraulic pump. A motor pumps hydraulic fluid or oil from a reservoir tank to the lifting cylinders 30. The oil is pumped through a conduit 39 made from PVC plastic running underneath the floor. Conduit 39 enters lift through a dedicated aperture in the side of primary angle 62 in upper section 12. The hydraulic conduit lines 39 ultimately connect to inlet of lifting cylinders 30.

Figure 2:
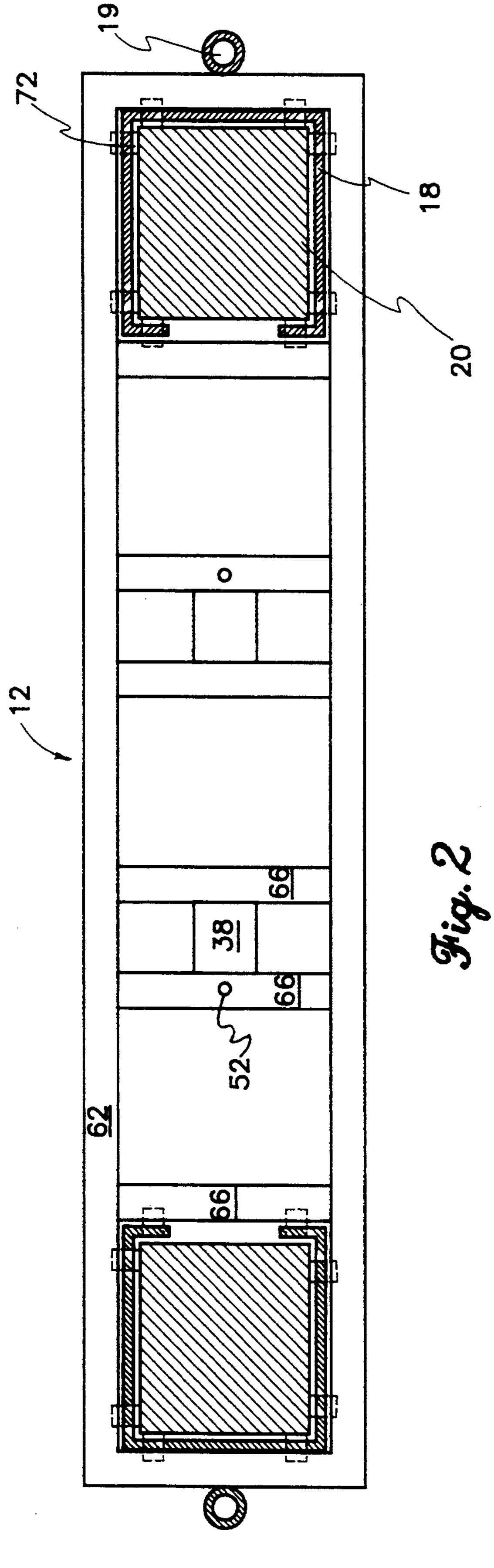
FIG. 2 is a view of the upper section of the lift taken along line 2—2 in FIG. 1, in accordance with the present invention.

As shown in FIG. 2, upper section 12, as viewed from the bottom, is preferably formed by primary angle 62 which is an elliptical four inch by six inch angle ("4×6 angle"). The primary angle 62 is welded around piston housing 18. A three inch by one-quarter inch angle ("3×¼ angle") 64 is welded to the primary angle 62 in order to form part of the holder for the floor cover plate 16. The quarter inch horizontal portion of angle 64 forms a supporting outer rim for cover plate 16. A series of straight angle braces 66 are set traversing the span between the parallel arms of ovoid primary angle 62 connecting the piston housings 18. Preferably there are at least six straight angle braces 66 attached to the horizontal portion of primary angle 62. Two distal straight angles 66 enclose the open end of the piston housing 18 across primary angle 62. Each cylinder mount post 38 is welded in place between the vertical portions of a pair of straight angle braces 66. The horizontal portion of angle braces 66 contain an chain anchor hole 52 for accepting and fixedly anchoring chain 50 to upper section 12.

Upper roller bearings 72 are located at the upper opening of piston housing 18. Upper roller bearings 72 are located along all four sides of rectangular piston housing 18 to protect the piston 20 from contortional stresses while assuring smooth running as piston 20 moves within piston housing 18. Two roller bearings 72 are preferably placed on the angles 62 and 66 surrounding the piston housings 18, to enhance the lifting stability of piston 20. Upper roller bearings 18 may be constructed of any suitable material such as polyethylene.

Figure 3:
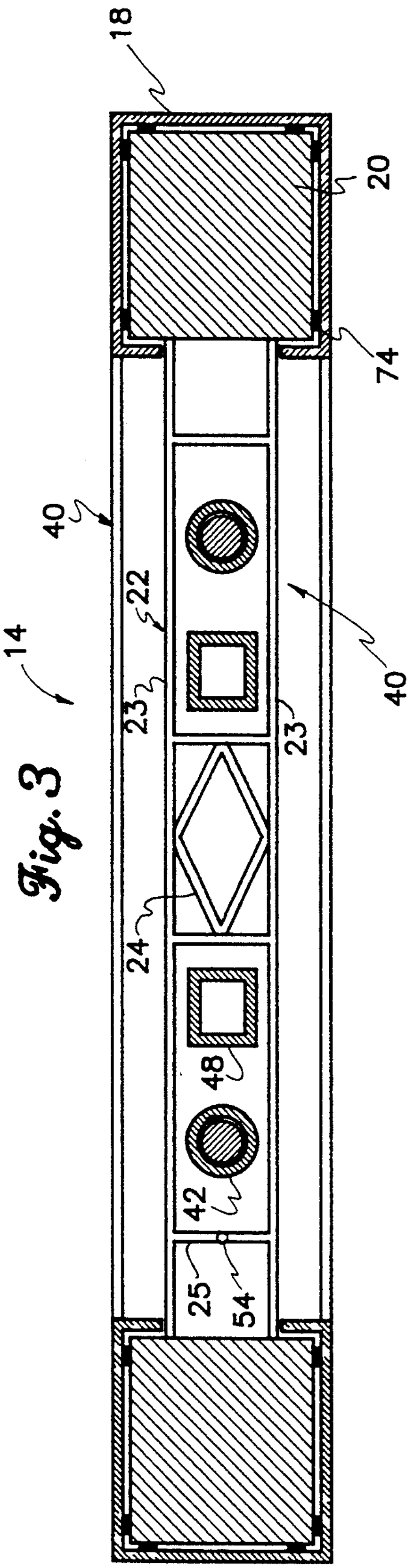
FIG. 3 is a view of the lower section of the lift taken along line 3—3 in FIG. 1, including the pistons and the equalizer beam, in accordance with the present invention.

The lower section of lift 10 is illustrated in FIG. 3. Insert mounts 42 and 48, respectively, for lifting cylinder sleeve 32 and mount posts 38 are formed in a U-shaped steel channel 40 which is welded to the bottom sides of both piston housings 18 to form a sealed bottom trough to capture any oil that leaks into the lift. Channel 40 is preferably 12 inches wide and six inches high. Opposing distal ends of equalizer beam 22 are welded to pistons 20 at a lower or bottom end of pistons 20. Equalizer beam 22 is shown as a pair of parallel beams 23 secured together by a series of welded support braces 24 and 25. Center support braces 24 are welded together along the interior area of equalizer beam 22 to form a diamond configuration in order to provide for greater lateral stability and to counter contortional stresses on equalizer beam 22. Lower chain anchor mount 54 for accepting chain 50 is located on distal anchor brace 23 that connects the two parallel beams 23 of equalizer beam 22. Lower rollers 74 may be attached to the lower ends of pistons 20 to assist in guiding pistons 20 along the sides of piston housing 18.

It is to be understood that the present invention is not limited to the exemplary embodiment described above. It will be apparent to those skilled in the art that various modifications and variations are possible within the spirit and scope of the present invention. The present invention encompasses any and all embodiments within the scope of the following claims.

I claim:

1. A lifting apparatus for raising an object, comprising:

an upper section;

at least one piston for lifting the object above said upper section;

at least one lifting cylinder support mount connected to said upper section;

at least one lifting cylinder for moving at least one said piston mounted on said lifting cylinder support mount;

pulley means for transferring force from said lifting cylinder to each said piston, said pulley means including a chain for connecting said upper section to a lower end of said piston;

a first pulley attached to an upper end of said lifting cylinder for coupling said chain to said lifting cylinder;

a second pulley attached to said lifting cylinder support mount and located below said first pulley;

wherein said chain follows along a path from said upper section to said second pulley, to said first pulley, to said lower end of said piston;

wherein said piston is lifted when said lifting cylinder is raised.

2. A lifting apparatus according to claim 1, wherein said second pulley is stationary.

3. A lifting apparatus according to claim 1, further comprising means for retaining a safety leg for said piston.

4. A lifting apparatus according to claim 1, wherein said upper section includes upper rolling means for guiding said piston.

5. A lifting apparatus according to claim 1, further comprising a second piston and an equalizing beam, wherein said equalizing beam connects a lower end of said piston and a lower end of said second piston.

6. A lifting apparatus according to claim 1, further comprising a second piston and an equalizing beam, wherein said equalizing beam connects a lower end of said piston and a lower end of said second piston;

wherein first roller means for guiding said piston is coupled to the lower end of said piston on a side opposite said equalizing beam; and wherein second roller means for guiding said second piston is coupled to the lower end of said second piston on a side opposite said equalizing beam.

7. A lifting apparatus according to claim 1, further comprising hydraulic means for moving said lifting cylinder.

8. A lifting apparatus for raising an object, comprising:

an upper section;

a lower section;

piston means for lifting the object above said upper section, said piston means including a first piston, a second piston and an equalizing beam, wherein a lower end of said first piston is linked to a lower end of said second piston by said equalizing beam;

at lest one lifting cylinder support mount having an upper end connected to said upper section and a lower end connected to said lower section;

at least one lifting cylinder for moving said piston means mounted on said lifting cylinder support mount;

pulley means for transferring force from said lifting cylinder to said piston means, said pulley means including a chain for connected said upper section to said equalizing beam;

a first pulley attached to an upper end of said lifting cylinder for coupling said chain to said lifting cylinder;

a second pulley attached to said lifting cylinder support mount and located below said first pulley;

wherein said chain follows along a path from said upper section to said second pulley to said first pulley to said equalizing beam;

wherein said piston means is lifted when said lifting cylinder is raised.

9. A lifting apparatus according to claim 8, further comprising hydraulic means for moving said lifting cylinder.

10. A lifting apparatus according to claim 8, wherein said second pulley is stationary.

11. A lifting apparatus according to claim 8, wherein said piston means further include first roller means for guiding said piston means, and second roller means for guiding said piston means;

wherein said first roller means are coupled to the lower end of said first piston on a side opposite said equalizing beam; and wherein said second roller means are coupled to the lower end of said second piston on a side opposite said equalizing beam.

12. A lifting apparatus according to claim 8, wherein said upper section includes upper rolling means for guiding said piston.

13. A lifting apparatus according to claim 8, wherein said piston means further includes first roller means for guiding said piston means, and second roller means for guiding said piston means;

wherein said first roller means is coupled to the lower end of said first piston on a side opposite to said equalizing beam; and wherein said second roller means is coupled to the lower end of said second piston on a side opposite to said equalizing beam; and wherein said upper section includes upper roller means for guiding said piston means.

14. A lifting apparatus according to claim 8, further comprising means for retaining a safety leg for said piston means.

* * * * *